(12) United States Patent
Goto et al.

(10) Patent No.: US 6,350,533 B1
(45) Date of Patent: Feb. 26, 2002

(54) WELDED SHEET METAL COMPONENT

(75) Inventors: Kiyoshi Goto; Toshiyuki Komizo, both of Okazaki (JP); Masayuki Enomoto, Okayama (JP)

(73) Assignee: Mitsubishi Jidosha Kogyo Kabushiki, Tokyo (JP)

( * ) Notice: Subject to any disclaimer, the term of this patent is extended or adjusted under 35 U.S.C. 154(b) by 0 days.

(21) Appl. No.: 09/217,927

(22) Filed: Dec. 22, 1998

(30) Foreign Application Priority Data

Dec. 25, 1997 (JP) .............................................. 9-367157

(51) Int. Cl.⁷ ........................ B32B 15/01; B32B 15/18
(52) U.S. Cl. .................... 428/615; 428/600; 428/636; 428/638; 228/103; 228/173.4; 73/799; 73/850; 73/851; 29/407.01
(58) Field of Search ................................ 428/600, 615, 428/636, 638, 594, 599, 603; 228/103, 105, 125, 155, 158, 153, 173.3, 173.6, 174; 73/799, 818, 826, 850, 851; 29/897, 897.2, 407.01, 407.08, 521; 72/379.6, 303

(56) References Cited

U.S. PATENT DOCUMENTS

| | | | | |
|---|---|---|---|---|
| 1,812,151 A | * | 6/1931 | Jacocks |
| 3,333,319 A | * | 8/1967 | Taylor |
| 3,486,219 A | * | 12/1969 | Davies et al. |
| 3,513,682 A | * | 5/1970 | Rowell |
| 3,590,622 A | * | 7/1971 | Ludlow et al. |
| 3,599,307 A | * | 8/1971 | Campbell et al. |
| 3,650,456 A | * | 3/1972 | Rowell |
| 3,716,908 A | * | 2/1973 | Rowell |
| 3,906,784 A | * | 9/1975 | Coulstring |
| 3,940,624 A | * | 2/1976 | Simmons |
| 4,059,897 A | * | 11/1977 | Marquis |
| 4,358,961 A | * | 11/1982 | Woods, Jr. |
| 4,425,802 A | * | 1/1984 | Sponseller |
| 4,573,360 A | * | 3/1986 | Yoneda |
| 4,610,166 A | * | 9/1986 | Elder et al. |
| 4,656,872 A | * | 4/1987 | Fischer |
| 4,875,376 A | * | 10/1989 | Fischer |
| 4,973,813 A | * | 11/1990 | Mitchell |
| 5,098,005 A | * | 3/1992 | Jack |
| 5,341,696 A | * | 8/1994 | Benedikt et al. |
| 5,597,959 A | * | 1/1997 | Rice et al. |
| 5,601,664 A | * | 2/1997 | Kosa et al. |
| 5,602,341 A | * | 2/1997 | Lee et al. |
| 5,669,440 A | * | 9/1997 | Bauer et al. |
| 5,738,268 A | * | 4/1998 | VanderPol et al. |
| 5,978,090 A | * | 11/1999 | Burri et al. |

* cited by examiner

*Primary Examiner*—Deborah Jones
*Assistant Examiner*—Jennifer McNeil

(57) ABSTRACT

A sheet metal component, obtained by press-forming a one-piece metal sheet comprised of two metal sheets into a desired shape, has an expanding portion having an external appearance varying in dependence on a weld state of a weld portion of the one-piece metal sheet at which the two metal sheets are welded at their confronting ends. In manufacturing the sheet metal component, the one-piece metal sheet is transferred between upper and lower dies of a pressing machine and is positioned such that its metal sheet section including part of the weld portion is disposed between a punch formed in the lower die and a recess formed in the upper die so as to face the punch. The metal sheet section is pressed by the punch to be subject to plastic deformation, whereby the expanding portion is formed.

11 Claims, 6 Drawing Sheets

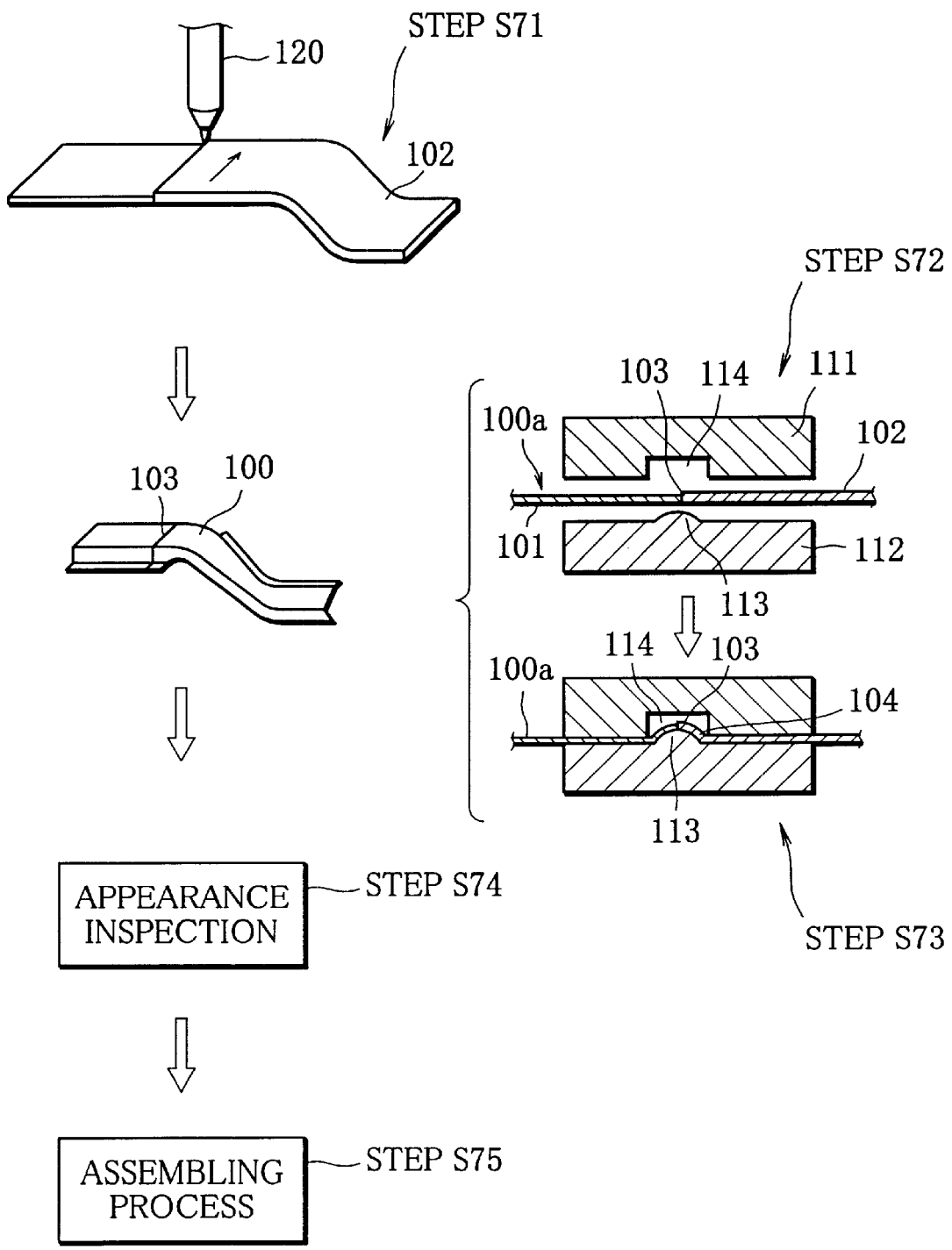

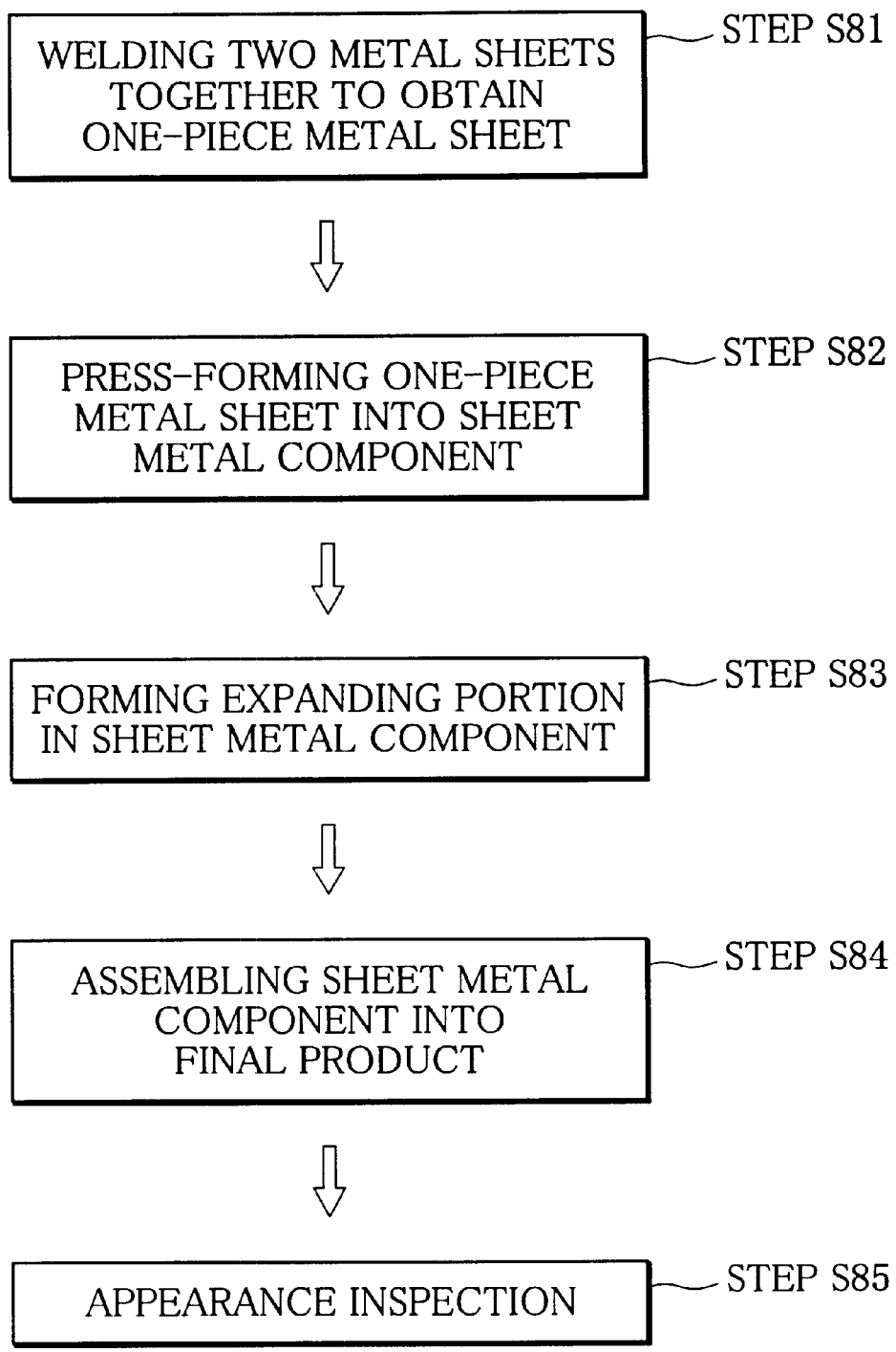

WELDED SHEET METAL COMPONENT

BACKGROUND OF THE INVENTION

1. Technical Field

The present invention relates to a sheet metal component and a method for manufacturing the same, and more particularly to, a sheet metal component which permits easy and reliable inspection of its weld quality and a manufacturing method thereof.

2. Related Art

Vehicular components such as a frame and a cross member affecting the safety of a vehicle are in some cases are constructed of sheet metal components. Some of these sheet metal components are obtained by welding two metal sheets at their confronting ends and by press-forming a resultant one-piece metal sheet into a desired shape. For example, a side frame of a vehicle is constituted by a front member comprised of a first metal sheet and a rear member comprised of a second metal sheet whose thickness and mechanical strength are larger than those of the first metal sheet, so that it may be deformed to absorb the impact upon head-on collision. The first and second metal sheets are subject to butt welding or lap welding, to be united with each other at their confronting ends, and the resultant one-piece metal sheet is subject to press forming to be formed into a side frame of a desired shape to which important security parts and/or specially guaranteed parts such as suspension unit, engine, transmission unit of a vehicle are attached. Thus, a weld failure caused in the side frame can result in a problem of safety of the vehicle.

In order to determine the weld quality in respect of important sheet metal components, such as side frame, greatly affecting the safety, it is advisable to carry out the total inspection of these components at the stage just after the components are fabricated or after entire cars each incorporating therein the sheet metal component are obtained. Thus, methods for carrying out such total inspection have been investigated.

The weld quality of a sheet metal component can be inspected accurately, if the component can be cut at its weld portion so that the cut portion may be subject to visual inspection for weld quality determination in term of, e.g., a magnifying glass. Although this method is applicable to a sampling inspection, it is of course impossible to apply such method to a total inspection. On the other hand, a weld quality determination of a sheet metal component such as a side frame cannot be made in term of a visual inspection at the stage of obtaining an entire car whose side frame is already painted.

SUMMARY OF THE INVENTION

An object of the present invention is to provide a metal sheet component having a weld portion whose weld quality can be determined easily and accurately in term of appearance inspection and a method for manufacturing such a metal sheet component.

According to one aspect of the present invention, there is provided a sheet metal component comprising a main body which is comprised of one-piece metal sheet obtained by welding two metal sheets at their confronting ends, and an expanding portion which projects from a surface of the main body at a welded portion of the main body and which has an external appearance varying in dependence on a weld state of the welded portion.

Preferably, the expanding portion projects from the surface of the main body by a predetermined amount which is set so as not to produce an unusual appearance, indicative of weld failure, in the expanding portion if the two metal sheets are welded properly at the welded portion and so as to produce the unusual appearance if they are improperly welded.

According to the sheet metal component of this invention, the expanding portion has its external appearance varying in dependence on the weld state of the welded portion of the one-piece metal sheet from which the sheet metal component is fabricated. That is, if the weld state (weld quality) is proper, no unusual appearance such as crack is caused in the expanding portion. On the other hand, if improper welding is made, the expanding portion has such an unusual appearance. Based on the appearance of the expanding portion, therefore, the weld state of the sheet metal component can be determined properly. In this manner, the sheet metal component of this invention permits an easy and accurate determination of the weld quality of the welded portion based only on the appearance inspection. For this reason, the present invention is especially useful to provide a sheet metal component such as an automotive frame to which an important security part or a specially guaranteed part is attached and of which affects the safety. Since sheet metal components whose weld quality can be determined positively by means of appearance inspection before and after they are assembled into final products, without the need of cutting the sheet metal components at their welded portions, they can be subject to a 100% inspection or total inspection. For instance, in the case of automotive side frames according to this invention, their weld qualities can be easily and accurately determined in total inspection at one or both of the stages before and after they are respectively assembled into vehicle bodies, whereby the quality assurance and the safety of vehicles can be improved.

In the present invention, the two metal sheets may have different shapes, e.g., different thicknesses. The two metal sheets may be butt-welded or lap-welded at their confronting ends. With these preferred sheet metal components, the two metal sheets are welded into the one-piece metal sheet having a required mechanical property and a desired shape which are suited to mechanical and appearance requirements of the sheet metal component. For instance, it is possible to provide an automotive side frame in which a front member, one of the two metal sheets, is greatly deformed when an impact force is applied thereto, thereby absorbing the impact force.

In the present invention, preferably, the expanding portion is formed into a semi-spherical shape, and has its top formed in alignment with part of the welded portion. With this preferred arrangement, the expanding portion has its external appearance more accurately represents the weld state of the weld portion, and therefore, a more accurate determination of the weld state in term of appearance inspection can be carried out.

According to another aspect of the present invention, there is provided a method for manufacturing a sheet metal component in which two metal sheets are welded at their confronting ends to obtain a one-piece metal sheet which is press-formed into the sheet metal component with use of a first pressing machine.

The manufacturing method comprises the steps of (a) transferring the one-piece metal sheet, which is already press-formed or is not press-formed as yet, between first and second press die halves of a second pressing machine and positioning a metal sheet section of the one-piece metal sheet between a punch formed in the first press-die half and a recess formed in the second press-die half so as to face the punch and permit the punch to intrude thereinto, the metal sheet section including part of a welded portion of the one-piece metal sheet, and (b) causing the punch to press the metal sheet section of the one-piece metal sheet so as to subject the metal sheet section to plastic deformation, to thereby form an expanding portion in the one-piece metal sheet, the expanding portion having its external appearance varying in dependence on a weld state of the welded portion.

Preferably, the step (b) includes causing a predetermined amount of plastic deformation in the metal sheet section, to thereby form the expanding portion. The predetermined amount of plastic deformation is set so as not to produce an unusual appearance, indicative of weld failure, in the expanding portion if the two metal sheets are properly welded and to produce the unusual appearance if they are improperly welded.

With the manufacturing method of this invention, a sheet metal component whose weld state is determinable by appearance inspection can be manufactured properly. Since the sheet metal component has the expanding portion which has an external appearance thereof varying in dependence on the weld state, the weld state can be properly determined based on the external appearance of the expanding portion.

Incidentally, the present invention was created by taking note of phenomenon which takes place in a test piece during Erichsen test in which a spherical punch is gradually pressed against a plate material (test piece) and the depth of pressing the punch observed just when a crack appears in the plate material is determined as an Erichsen value for the evaluation of formability of the plate material.

As distinct from the Erichsen test in which the test piece is subject to plastic deformation until a crack actually appears in the test piece, the present invention forms the expanding portion by subjecting the metal sheet section, including part of the welded portion, of the one-piece metal sheet to plastic deformation until a predetermined amount of deformation is caused in the metal sheet section. The predetermined amount of plastic deformation is restricted to the extent that no crack appears in the expanding portion if the weld state of the welded portion of the one-piece metal sheet is proper as usual.

In the present invention, preferably, the steps (a) and (b) are carried out, with use of the second pressing machine which also serves as the first pressing machine, at the same time when the one-piece metal sheet is press-formed into the sheet metal component of a desired shape, whereby the expanding portion is formed simultaneously when the one-piece metal sheet is press-formed. With this preferred method, the efficiency of manufacturing the sheet metal component having the expanding portion can be improved, and in particular, sheet metal components subjected to total inspection in respect of weld quality can be manufactured efficiently.

Alternatively, the expanding portion is formed in the one-piece metal sheet with use of the second pressing machine, exclusively used for formation of the expanding portion, other than the first pressing machine. The formation of the expanding portion is made before or after the one-piece metal sheet is press-formed. According to this modified method, a sheet metal component with or without the expanding portion can be manufactured where required. Thus, a sampling inspection in respect of the weld quality of a large number of sheet metal components can be made by providing some of them with expanding portions and subjecting the same to inspection based on external appearances of the expanding portions.

Preferably, the two metal sheets are butt-welded or lap-welded at the welded portion.

Preferably, the steps (a) and (b) are carried out by using the punch formed into a semi-spherical shape, and the expanding portion is formed into a semi-spherical shape.

Preferably, the step (a) includes positioning the one-piece metal sheet so that the part of the welded portion is in alignment with a distal end of the punch, and the step (b) is carried out in this positioning state, thereby forming the expanding portion whose top is formed in alignment with the part of the welded portion.

Preferably, the second press-die half does not apply a force onto the metal sheet section as the metal sheet section is subject to the plastic deformation within the recess of the second press-die half by being pressed by the punch of the first press-die half in the step (b). With this preferred method, the expanding portion having its external appearance representing the weld state of the welded portion more accurately can be formed.

BRIEF DESCRIPTION OF THE DRAWINGS

FIG. 7 is a view, similar to FIG. 3, showing manufacturing processes and other processes in respect of the side frame shown in FIG. 5; and FIG. 8 is a block diagram showing a manufacturing method according to a modification of this invention, together with assembling and inspecting processes.

DETAILED DESCRIPTION

With reference to the appended drawings, a sheet metal component according to a first embodiment of the present invention and a method for manufacturing the same will be explained by taking, as an example, an automotive side frame which is one of sheet metal components constituting a vehicle.

Figure 1:
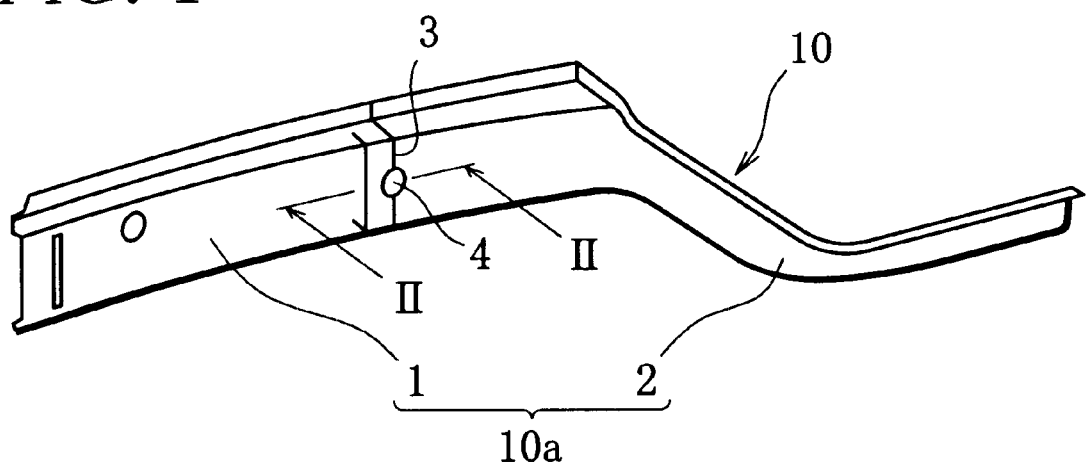
FIG. 1 is a schematic perspective view showing an automotive side frame according to a first embodiment of this invention and manufactured with use of mush-seam welding.
Figure 2:
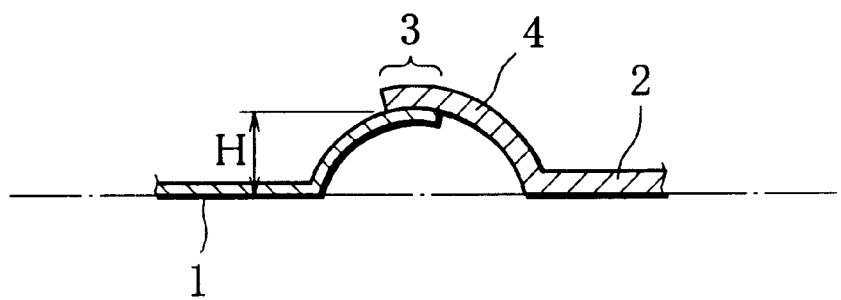
FIG. 2 is a fragmentary enlarged sectional view showing an expanding portion of the side frame taken along II—II line shown in FIG. 1.

A side frame shown by reference numeral 10 in FIG. 1 comprises a main body 10a which is obtained by press-forming a one-piece metal sheet into a desired shape, the one-piece metal sheet being obtained by welding first and second metal sheets 1 and 2 together. The first metal sheet 1 serves as a front member of the side frame, and the second metal sheet 2 serves as a rear member of the frame. As best shown in FIG. 2, a rear end portion of the first metal sheet 1 and a front end portion of the second metal sheet 2 overlap each other at a welded portion 3 of the frame main body 10a. The first and second metal sheets 1 and 2 are lap-welded (mush-seam welded in this embodiment) at the welded portion 3.

In order to permit the weld quality (weld state) of the welded portion 3 to be determined by appearance inspection, the frame main body 10a is formed with an expanding portion 4. This expanding portion 4 is formed by subjecting a section (hereinafter referred to as metal sheet section or deformed section) of the frame main body 10a to plastic deformation, the metal sheet section including a vertically central part of the welded portion 3. The expanding portion 4 projects from an outer side surface of the frame main body 10a outwardly in the width direction of a vehicle (not shown). In this embodiment, the expanding portion 4 is formed into a semi-spherical shape, and has a top thereof formed in alignment with the central part of the welded portion 3.

The amount of projection (height H) of the expanding portion 4 corresponds to an amount of plastic deformation of the metal sheet section for the formation of the expanding portion 4. The height H (plastic deformation amount) of the expanding portion 4 is set such that an unusual appearance (e.g., crack) indicative of weld failure does not appear in the expanding portion 4 if the expanding portion is formed by plastic deformation of the metal sheet section including the central part of the weld portion 3 which is properly welded, whereas such an unusual appears if the expanding portion 4 is formed by plastic deformation of the metal sheet section which includes the central part of the weld portion 3 improperly welded.

Figure 3:
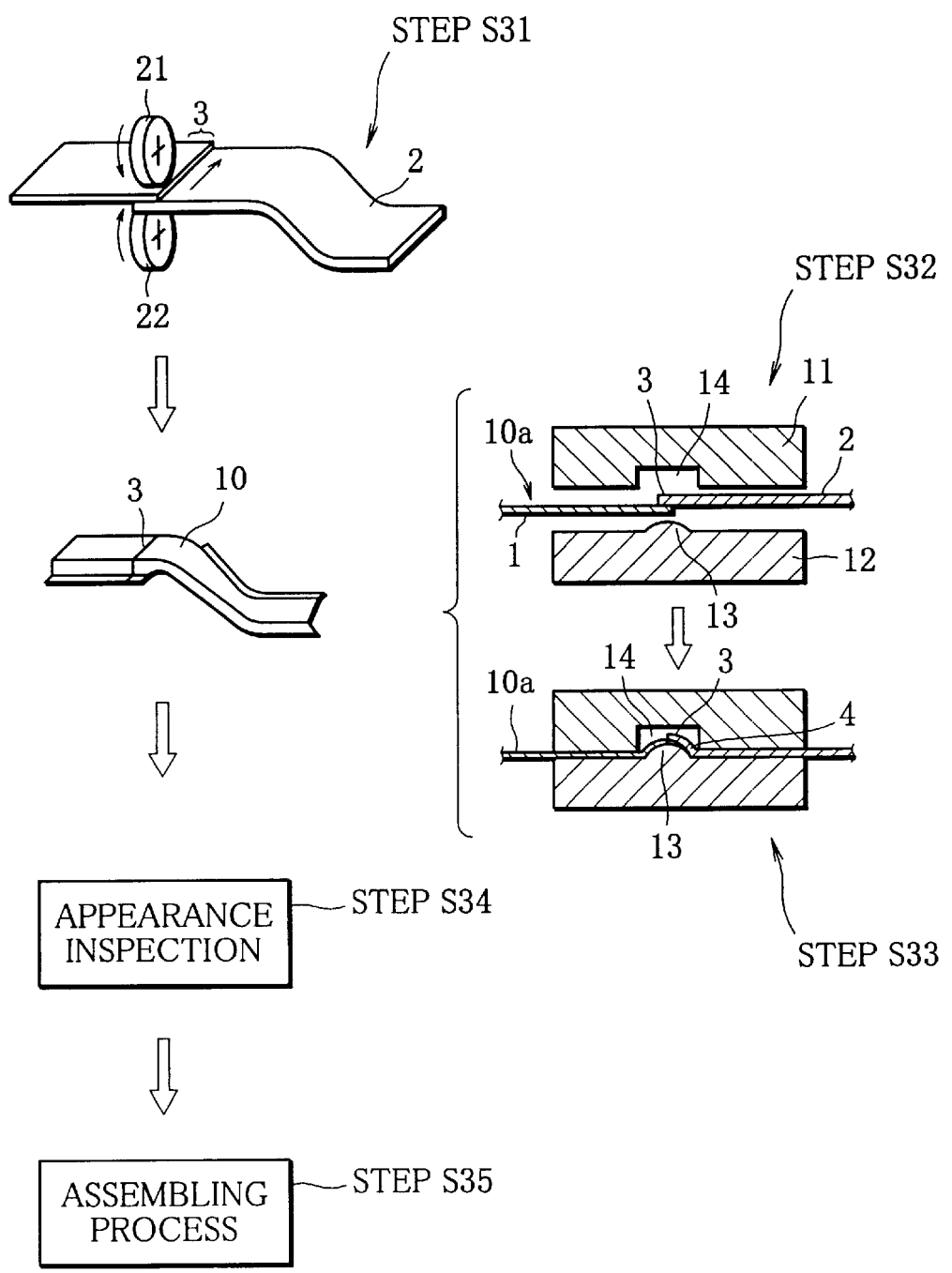
FIG. 3 is a view showing manufacturing processes and other processes in respect of the side frame shown in FIG. 1, the uppermost part on the left of FIG. 3 showing a process of subjecting two metal sheets to mush-seam welding to obtain a one-piece metal sheet, the second-upper part thereof showing the side frame obtained by press-forming the one-piece metal sheet, the upper right part thereof showing a process of positioning the one-piece metal sheet in a pressing machine, the lower right part thereof indicating a process of press-forming the expanding portion in the one-piece metal sheet, the second-lower part on the left of FIG. 3 showing a process of appearance inspection, and the lowermost part thereof showing a process for assembling the side frame into a vehicle body.

With reference to FIG. 3, a method of manufacturing the side frame 10 shown in FIGS. 1 and 2 will be explained below.

First, a steel plate having, e.g., 1.4 mm thickness is cut into a desired shape to thereby obtain the first metal sheet 1, and a steel plate having, e.g., 2.3 mm thickness is cut into a desired shape to obtain the second metal sheet 2. Next, the first metal sheet 1 is placed on the second metal sheet 2 with the lower face of the rear end portion of the first metal sheet 1 abutted against the upper face of the front end portion of the second metal sheet 2, to thereby overlap the confronting ends (more specifically, the confronting end portions) of these sheets 1 and 2 each other. Then, the overlapping portion is held between two circular plate electrodes 21 and 22 of a much-seam welding machine shown in FIG. 4, these electrodes having both a pressing function and electric power supplying function. The first and second metal sheets 1 and 2 are clamped by clamping mechanisms, not shown, of the mush-seam welding machine.

Figure 4:
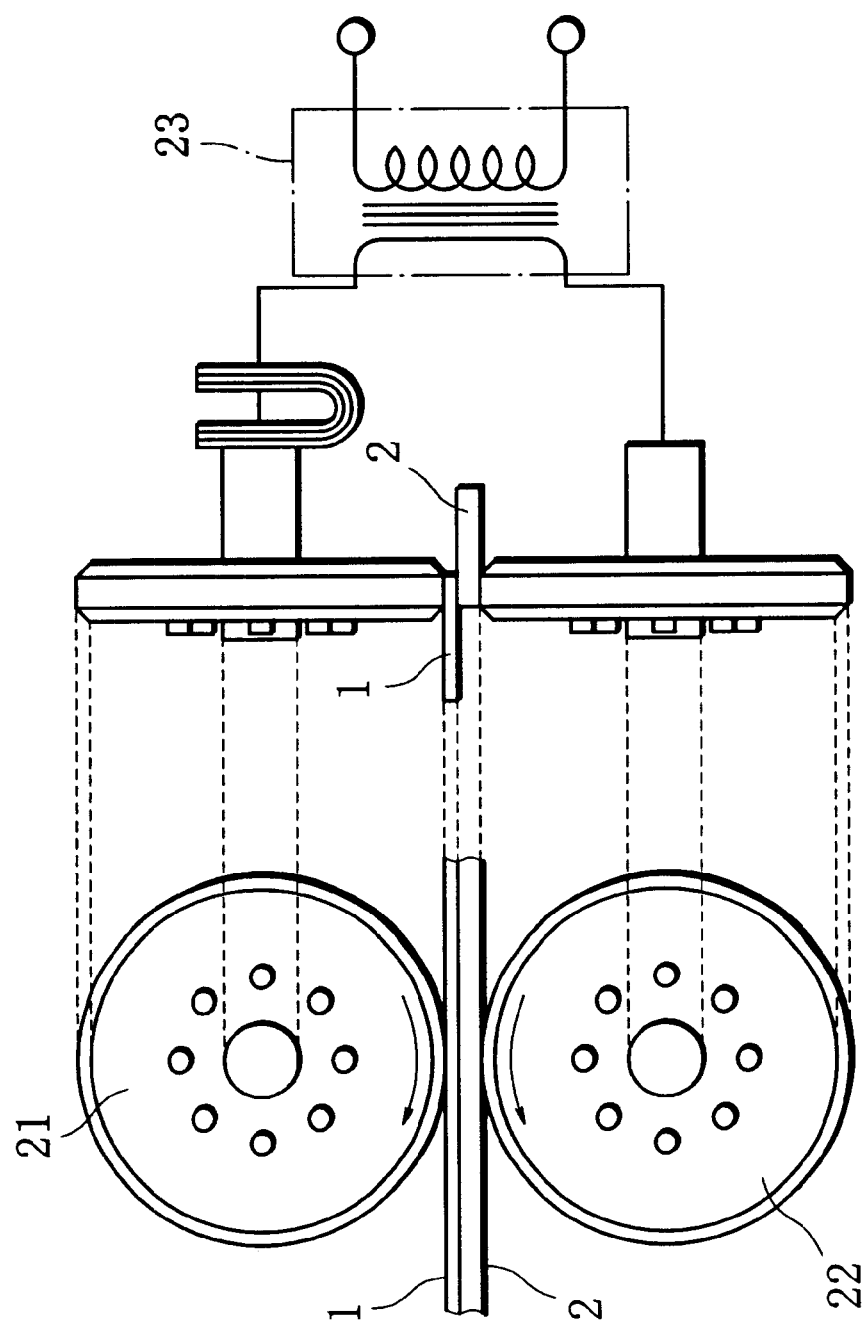
FIG. 4 is a fragmentary enlarged view showing several elements of a mush-seam welding machine for the mush-seam welding shown in the uppermost left part of FIG. 3, together with the one-piece metal sheet.

The width of the overlapping portion of the metal sheets 1 and 2, i.e., the width of the welded portion 3, is set to be smaller than the width of the electrodes 21 and 22. In FIG. 4, reference numeral 23 denotes a weld transformer having the primary winding thereof connected with a power source (not shown) and the secondary winding thereof connected to the electrodes 21 and 22.

As shown in the uppermost part (Step S31) on the left of FIG. 3, respective lengthwise sections of the overlapping portion of the metal sheets 1 and 2 are pressed and heated in sequence by the circular plate electrodes 21 and 22 while supplying a weld current from the weld transformer 23 (FIG. 4) to the electrodes 21 and 22 and while rotating the electrodes 21 and 22, so as to weld the overlapping portion of the metal sheets 1 and 2 straight by means of mush-seam welding, thereby obtaining a one-piece metal sheet 1, 2.

Next, the one-piece metal sheet 1, 2 is press-formed into the frame main body 10a (more generally, the side frame 10) and at the same time the expanding portion 4 is formed at and around the central part of the welded portion 3.

A pressing machine for both the press forming of the one-piece metal sheet and the formation of the expanding portion 4 has an upper die (first press-die half) 11 and a lower die (second press-die half) 12, as shown in the upper right part of FIG. 3. Although an illustration is omitted in FIG. 3, the upper and lower dies 11 and 12 have press-forming faces suitable for press-forming the one-piece metal sheet into the side frame 10 of a desired shape. In relation to the formation of the expanding portion 4, the press-forming face of the lower die 12 is provided with a punch 13 formed into a semi-spherical shape, and the press-forming face of the upper die 11 is provided with a recess 14 facing the punch 13 of the lower die 12. The recess 14 provides a space for permitting the intrusion of the punch 13. In this embodiment, the recess 14 is arranged to provide a free space on the side opposite to the punch 13 with resect to the metal sheet section of the one-piece metal sheet even in a state where the facing faces of the upper and lower dies 11 and 12 abut against each other so that the punch 13 finishes pressing the metal sheet section of the one-piece metal sheet 1, 2.

For the simultaneous formation of the side frame 10 and the expanding portion 4, the one-piece metal sheet 1, 2 is first transferred between the upper and lower dies 11 and 12 of the pressing machine, as shown by Step S32 in FIG. 3, and is then positioned so that its metal sheet section is located between the punch 13 of the lower die 12 and the recess 14 of the upper die 11. In this embodiment, the one-piece metal sheet 1, 2 is positioned such that the central part of the welded portion 3, included in the metal sheet section, is disposed in alignment with the distal end of the punch 13.

Under this positioning state, the pressing machine is operated to make a press-forming action as shown in the lower right part (Step S33) of FIG. 3. During the press-forming action, the metal sheet section of the one-piece metal sheet 1, 2 is pressed at its lower face by the semi-spherical punch 13 to thereby subject the metal sheet section to plastic deformation, in a condition that the one-piece metal sheet is held, at its part around the metal sheet section, between the upper and lower dies 11 and 12, whereby the semi-spherical expanding portion 4 is formed. Since the recess 14 is formed in the upper die 11 so as to provide a free space between the metal sheet section and the upper die 11 on the side away from the punch 13 with respect to the metal sheet section, the upper die 11 does not apply any substantial force onto the metal sheet section while the same section is pressed by the punch 13 to be subject to plastic deformation. That is, no undesired force is applied to the metal sheet section during the formation of the expanding portion 4, so that the expanding portion 4 has its external appearance which accurately represents the weld quality of the welded portion 3. More specifically, an unusual appearance (crack, for instance) indicative of weld failure does not appear in the expanding portion 4, if the same portion 4 is formed by the plastic deformation of the metal sheet section including part of the welded portion 3 at which the first and second metal sheets 1 and 2 are properly welded. On the other hand, such an unusual appearance is caused, if the expanding portion 4 is formed by the plastic deformation of the metal sheet section including part of the welded portion 3 at which the metal sheets are welded improperly.

The external appearances of expanding portions of side frames 10 (preferably, all the side frames) each manufactured in the above manner are visually inspected or subject to visual inspection in term of a magnifying glass, as shown by Step S34 in FIG. 3. Those side frames 10 free from an unusual appearance such as a crack and thus having an adequate weld quality are mounted to vehicle bodies, respectively, in a body assemble process (shown by Step S35 in FIG. 3). Alternatively, the weld quality of side frames 10 are inspected based on external appearances of their expanding portions 4 at the stage of obtaining entire cars into which the side frames are respectively assembled, as generally shown by Steps S84 and S85 in FIG. 8.

Figure 5:
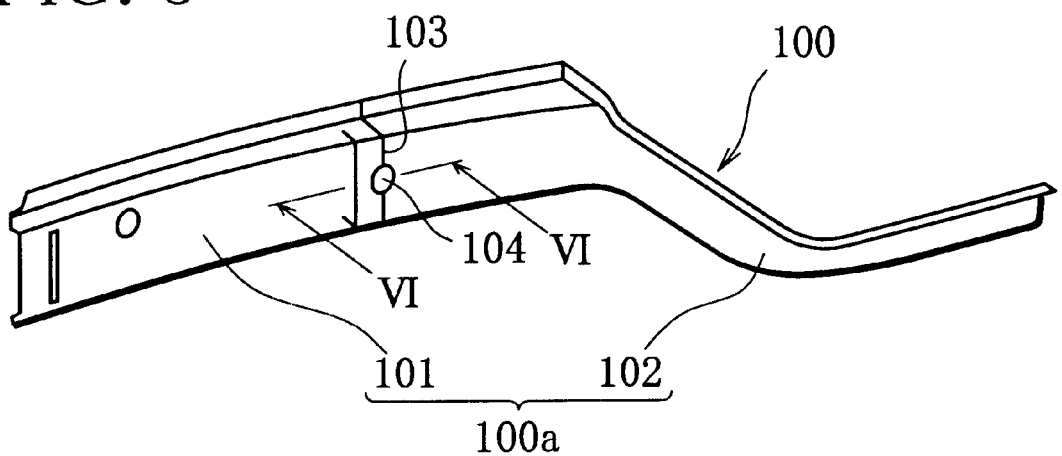
FIG. 5 is a schematic perspective view showing an automotive side frame according to a second embodiment of this invention and manufactured with use of laser welding.
Figure 6:
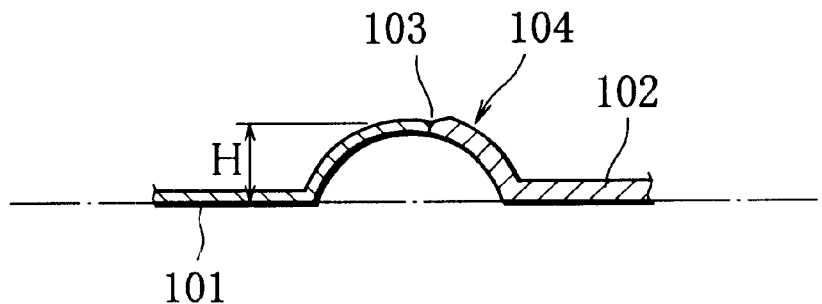
FIG. 6 is a fragmentary enlarged sectional view showing an expanding portion of the side frame taken along VI—VI line shown in FIG. 5.

With reference to FIGS. 5–7, a side frame according to a second embodiment of this embodiment and a method for manufacturing the same will be explained below.

As compared to the first embodiment having two metal sheets 1 and 2 are lap-welded, a side frame 100 of this embodiment is different in that two metal sheets 101 and 102 are butt-welded at their confronting ends, in term of, e.g., laser welding. The side frame 100 has a basic construction which is substantially the same as that of the side frame 10 of the first embodiment. In this regard, the side frame 100 and the manufacturing method will be explained briefly with reference to FIGS. 5–7 in which each frame element is denoted by reference numeral corresponding to the sum of 100 and reference numeral of an associated element of the first embodiment.

As best shown in FIG. 6, the first and second metal sheets 101 and 102 of the side frame 100 are laser-welded at their confronting ends (welded portion 103) to be formed into a one-piece metal sheet. The side frame 100 is formed with a semi-spherical expanding portion 104 by subjecting a section of the one-piece metal sheet, including a central part of the welded portion 103, to plastic deformation. The expanding portion permits the weld quality of the welded portion 103 to be determined by appearance inspection. The top of the expanding portion 104 is in alignment with the central part of the welded portion 103. The height H of the expanding portion 104 is set such that no unusual appearance (a crack, for instance) appears in the expanding portion 104 if the welded portion 103 is properly welded, whereas such an unusual appearance appears if the welded portion 103 is improperly welded.

For manufacturing the side frame 100, the first and second metal sheets 101 and 102 are abut against each other at their confronting ends, and these metal sheets are laser-welded into a one-piece metal sheet by use of a laser welding machine which includes a weld torch 120, as shown by Step S71 in FIG. 7.

Next, the one-piece metal sheet is press-formed into a side frame main body 100a (more generally, into the side frame 100) and at the same time the expanding portion 104 is formed in the metal sheet section which includes the central part of the welded portion (weld line) 103 of the one-piece metal sheet.

A pressing machine for both the press forming of the one-piece metal sheet and the formation of the expanding portion 104 has an upper and lower dies 111 and 112 as shown in the upper right part of FIG. 7, the upper and lower dies having their press-forming faces corresponding to an outer shape of the side frame 100. Further, the lower die 112 is formed at its press-forming face with a semi-spherical punch 113, and the upper die 111 is formed at its press-forming face with a recess 114 which faces the punch 113 of the lower die 112.

For the simultaneous formation of both the side frame 100 and the expanding portion 104, the one-piece metal sheet is transferred between the upper and lower dies 111 and 112 of the pressing machine and is positioned such that the metal sheet section is disposed between the punch 113 and the recess 114 and that the central part of the weld line 103 included in the metal sheet section is in alignment with the distal end of the punch 113, as shown by Step S72 in FIG. 7. Under this positioning state, the pressing machine is operated to make a press-forming action, as shown in the lower right part (Step S73) of FIG. 7.

External appearances of expanding portion of side frames 100 manufactured in the above manner are inspected (Step S74), preferably in term of total inspection, and those side frames which are adequate in weld quality are assembled into vehicle bodies, respectively, in a body assembling process (Step S75). Alternatively, the appearance inspection is made at the stage of assembling the side frames 100 into the vehicle bodies, respectively, to thereby obtain entire cars (see, FIG. 8).

The present invention is not limited to the first and second embodiments explained in the above, but may be modified in various manners.

For instance, the present invention is applicable to a variety of sheet metal components obtained by butt-welding or lap-welding two metal sheets into a one-piece metal sheet and by press-forming the one-piece metal sheet, although a case where this invention is applied to an automotive side frame has been explained in the preferred embodiments.

In the first and second embodiments, the lap-welding in term of mush-seam welding and the butt-welding in term of laser welding have been explained, respectively. However, other methods for butt welding or lap welding may be used in the present invention.

The expanding portion may be formed into a U-shape or a polygonal shape in cross section although it is formed into a semi-spherical shape (a semi-circular shape in cross section) in the embodiments. It is not inevitably necessary to form the expanding portion such that it has a top formed in alignment with part of the welded portion (weld line). That is, the expanding portion may be formed to have an off-center part which includes part of the welded portion. In the preferred embodiments, the expanding portion projects outwardly from the surface of the sheet metal component, so as to make it easy to perform the appearance inspection of the expanding portion. Alternatively, the expanding portion may project inwardly.

In the preferred embodiments, the expanding portion is formed at the same time when the one-piece metal sheet is press-formed into a desired shape, with use of a single pressing machine serving as first and second pressing machines. Alternatively, after the sheet metal component (more specifically, a main body thereof) is obtained by press-forming the one-piece metal sheet with use of a first pressing machine, the expanding portion may be formed with use of a second pressing machine other than the first pressing machine, as generally shown by Steps S82 and S83 in FIG. 8 including Step S81 for obtaining the one-piece metal sheet.

What is claimed is:

1. A sheet metal component, comprising:

a main body comprised of one-piece metal sheet obtained by welding two metal sheets at their confronting ends; and an expanding portion projecting from a surface of said main body at a welded portion of said main body and having an external appearance varying in dependence on a weld state of the welded portion; and wherein said expanding portion projects from the surface of said main body by a specific amount which is set so as not to produce an appearance, indicative of weld failure, in said expanding portion if the two metal sheets are welded properly at the welded portion and to produce an appearance of weld failure if they are improperly welded.

2. The sheet metal component according to claim 1, wherein the two metal sheets have different shapes.

3. The sheet metal component according to claim 2, wherein the two metal sheets have different thicknesses.

4. The sheet metal component according to claim 1, wherein the two metal sheets are butt-welded at the confronting ends.

5. The sheet metal component according to claim 1, wherein the two metal sheets are lap-welded at the confronting ends.

6. The sheet metal component according to claim 1, wherein said expanding portion is formed into a semi-spherical shape.

7. The sheet metal component according to claim 1, wherein said expanding portion has its top formed in alignment with part of the welded portion.

8. The sheet metal component according to claim 1 wherein the expanded portion has a crack indicating of weld failure.

9. The sheet metal component according to claim 1, wherein height is the specific amount.

10. The sheet metal component according to claim 1, wherein the two metal sheets have continuous uninterrupted imperferate surfaces at the welding of the ends, wherein the imperferate surfaces are in the area of the expanded portion.

11. The sheet metal component according to claim 1, wherein the expanding portion is only located solely adjacent the weld.

* * * * *